May 22, 1962   C. H. ANDERSON ET AL   3,035,722
VEHICLE LOADING DEVICE

Filed Sept. 1, 1959   7 Sheets-Sheet 2

FIG.3

INVENTORS
CARL H. ANDERSON
& NORLAND C. BROWN
BY

*McMorrow, Berman + Davidson*
ATTORNEYS

INVENTORS
CARL H. ANDERSON
& NORLAND C. BROWN
BY McMorrow, Berman & Davidson
ATTORNEYS United States Patent Office 3,035,722
Patented May 22, 1962

3,035,722
VEHICLE LOADING DEVICE
Carl H. Anderson, 655 N. State, and Norland C. Brown, Box 56, both of Trenton, Utah
Filed Sept. 1, 1959, Ser. No. 837,498
9 Claims. (Cl. 214—78)

This invention relates to the general class of material handling devices and, more specifically, the invention pertains to means for handling solid materials and articles such as, for example, baled hay, boxes, cartons, containers for liquids or solids, and other similar articles suitably adapted to be handled by spikes or cooperating opposed pairs of tines.

One of the primary objects of this invention is to provide material handling apparatus of the type generally described supra, which is especially designed for incorporation with a vehicle body to effect loading of the body in a single or in multiple tiers of the material to be loaded, the loading to be accomplished from either side of the vehicle.

Another object of this invention is to provide a lift or loading device for loading the bed of a vehicle, such as a truck bed, wherein the lift is mounted on the vehicle chassis or bed, and the control means therefor are exterior of the vehicle cab as are secondary controls for the driving, steering and braking of the vehicle whereby only one operator is required for the operation of the vehicle and the lift.

A further object of this invention is to provide a hydraulically controlled lift for loading the bed of the truck together with secondary driving means for controlling the movement of the truck and including hydraulically controlled means for steering the truck.

Still another object of this invention is to provide, in a hydraulic lift, a pair of booms having an end to end pivotal connection and wherein the booms are connected to means to effect pivotal movement about both horizontal and vertical axes.

It is a still further object of this invention to provide a hydraulic lift of the type generally described in the immediately preceding paragraph together with a hydraulically controlled material pick-up device mounted for pivotal movement about the longitudinal axis of one of the booms together with hydraulically controlled material pick-up tines.

A still further object of this invention is to provide hydraulic means for controlling the angular positions of the two booms relative to each other.

This invention contemplates, as a still further object thereof, the provision of a device as described supra, the device or apparatus being non-complex in construction and assembly, inexpensive to manufacture and durable in use.

Other and further objects and advantages of the instant invention will become more evident from a consideration of the following specification when read in conjunction with the annexed drawings, in which.

Reference numeral 20 designates an automotive vehicle of conventional truck design which includes the usual chassis 22 having longitudinally extending side frame members 24, 26 connected together by longitudinally spaced cross-braces 28. The chassis 22, on the upper side thereof, supports a plurality of transversely extending, longitudinally spaced risers 30 across which and secured thereto is a conventional truck bed 32. In this case, and according to the teachings of this invention, the inner end of the bed 32 terminates adjacent to but spaced from the adjacent or back end of the truck cab 34. The chassis 20 is supported on the usual front steering wheels 36 and conventional dual rear wheels 38 and, to serve a purpose to be described, a normally vertical inner end wall 40 is secured to the inner end of the bed 32 and to the chassis 22.

The conventional steering means is designated at 42 and includes a steering wheel 44. The automotive vehicle 20 is also provided with the usual accelerating operating means 46 including an accelerator foot pedal 48, and hydraulic or mechanical brake operating means (not shown) of conventional design, all to be operated from within the cab 34.

The instant invention is addressed to a boom lifting material handling apparatus denoted in general by reference numeral 50. This apparatus comprises an elongated substantially rectangular mounting plate 52 which extends transversely across the chassis and has one of its ends rigidly secured as by clamping to one of the side frame members 26 by means of bolts 54 which extend therethrough and through a clamping plate 56 subjacent to the frame member 26. Bolts 58 extend through the other end of the mounting plate 52 on opposite sides of the side frame member 24 and engage a tongue 60 forming a longitudinal extension of the bight portion 62 of an inverted substantially U-shaped platform 64 having depending oppositely disposed spaced and substantially parallel strengthening flanges 66, 68. The mounting plate 52 also includes a flange 70 adjacent one side thereof which extends transversely of the chassis 22 to which is connected one end of a strut 72 as at 74, the other end of the strut being connected to the bight 62 as at 75 to reinforce the same.

The mounting plate 52 has integrally formed therewith a plurality of triangular reinforcing flanges 76 which converge towards each other inwardly of the plate 52 and integrally merge with a normally upright sleeve 78, and to the upper ends thereof is fixedly secured a platform 80.

Figure 1:
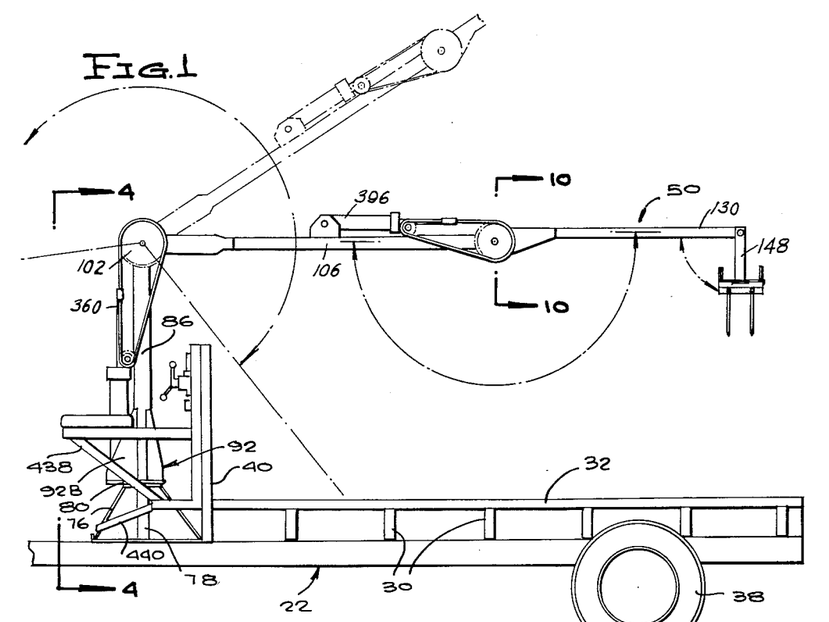
FIGURE 1 is a side elevational view of the hydraulically controlled material handling device or apparatus constructed in accordance with this invention, the apparatus being shown as supported on the chassis of a conventional truck having a material carrying bed.
Figure 2:
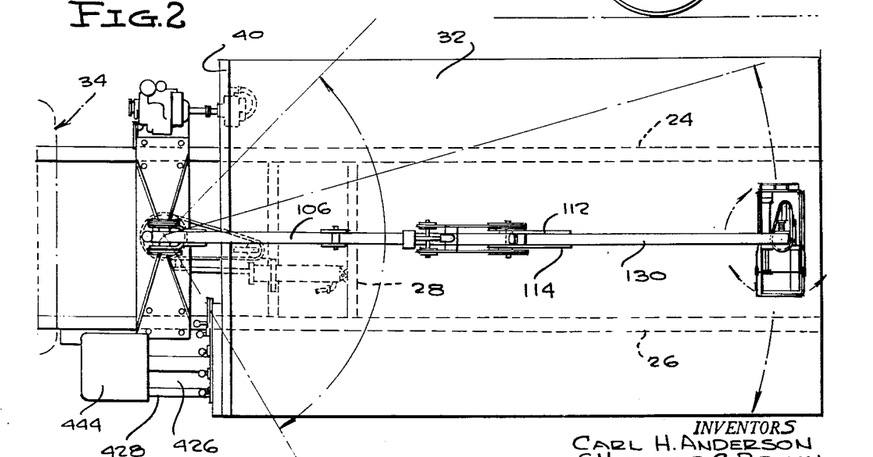
FIGURE 2 is a top plan view of the hydraulic material handling apparatus illustrated in FIGURE 1.
Figure 3:
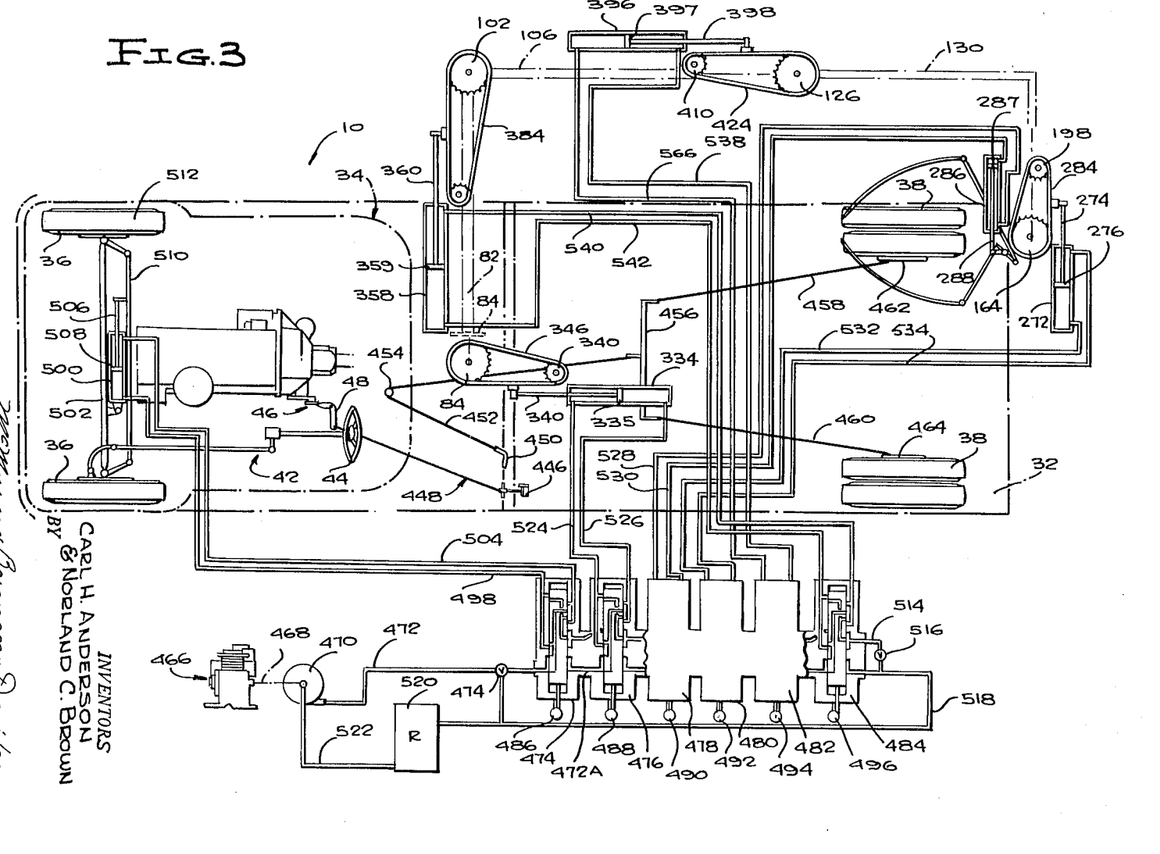
FIGURE 3 is a diagram illustrating the hydraulic controls and lines associated therewith for operating the material handling apparatus and further illustrating control means external from the truck cab for steering, accelerating, and braking the vehicles.
Figure 8:
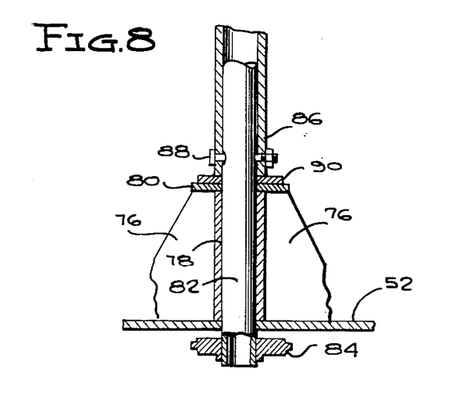
FIGURE 8 is an enlarged detail fragmentary cross-sectional view taken substantially on the vertical plane of line 8—8 of FIGURE 5, looking in the direction of the arrows.
Figure 9:
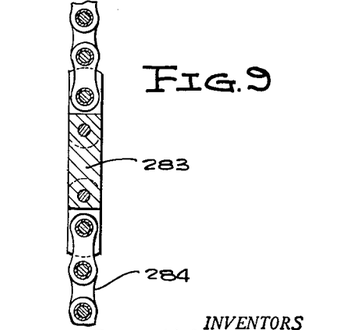
FIGURE 9 is an enlarged fragmentary detail cross-sectional view taken substantially on the vertical plane of line 9—9 of FIGURE 4, looking in the direction of the arrows.

Extending through the sleeve 78 and below and above the mounting plate 52 and platform 80 is an elongated hollow tubular rotatable shaft 82 having a sprocket 84 (see FIGURE 8) rigidly secured to the lower end of the shaft for rotation therewith. The shaft 82 at its other end is telescopically received within the lower end of a second substantially hollow tubular sleeve 86 and is connected in driving relation therewith by means of a bolt 88 which extends diametrically through each. To the lower end of the sleeve 86 is rigidly secured a bearing thrust plate 90 which rests upon and is supported by the platform 80 (see FIGURES 1, 4 and 5). A plurality of reinforcing flanges 92 are rigidly secured to the sleeve 86 and to the plate 90 and these flanges include a pair of flanges indicated at 92A and 92B (see FIGURES 4 and 5) which are substantially parallel relative to each other to serve a function to be described.

Extending diametrically through the upper end of the sleeve 86 is an axle 94 and the opposed projecting ends thereof have mounted for rotation thereon a pair of diametrically opposed bracket plates 96, 98 and a pair of sprockets 100, 102. Bolts 104 rigidly connect the bracket plate 96 with the sprocket 100 and the bracket plate 98 with the sprocket 102.

The inner end of a first hollow tubular boom 106 is rigidly connected, as by welding, between the bracket plates 96, 98, and the other end thereof is provided with a diametrically extending axle 108 (see FIGURE 10) which projects beyond the opposed sides thereof. Intermediate the ends of the axle 108 is disposed a hollow cylindrical bearing sleeve 110 which projects through suitable apertures formed in a pair of diametrically opposed gusset plates 112, 114 and a pair of spaced and parallel side walls 116, 118 of an inverted substantially U-shaped saddle 120 having an upper bight portion 122 connecting the upper adjacent ends thereof (see FIGURES 6 and 10). Also mounted on the axle 108 adjacent the remote sides of the side walls 116, 118 are a pair of sprockets 124, 126 which are directly connected to the gusset plates 112, 114 and the side walls 116, 118 by means of bolts 128.

The inner end of a second hollow tubular boom 130 (see FIGURES 5, 6 and 10) is rigidly connected, by conventional means, to the gusset plates 112, 114 and to the bight 122. The outer end of the boom 130 has one of the ends of a pair of normally depending diametrically disposed, normally vertical, side arms 132, 134 pivotally connected thereon by means of an elongated bolt 136 which projects laterally beyond the outer side of the arm 132. A boss 138 is integral with the upper end of the arm 132 and with a brake disc 140 which surrounds the bolt 136. Also mounted on the bolt 136 in opposed confronting relation with respect to the brake disc 140 is a friction disc 142. The adjacent sides of the discs 140, 142 are constantly urged into engagement one with another by means of a helicoidal spring 144 which surrounds the bolt 136 and is interposed between a tension adjusting nut 146 and the adjacent side of the disc 142.

Figures 11, 12:
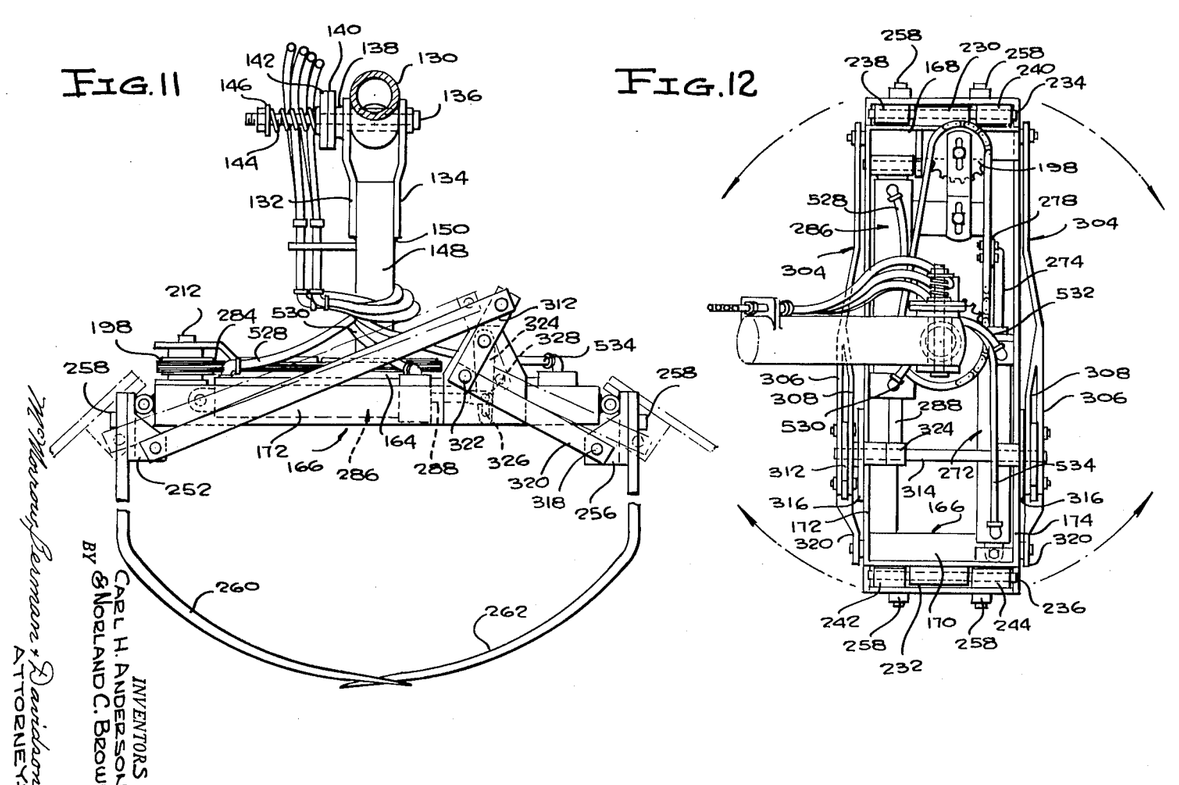
FIGURE 11 is a side elevational view, partly in cross-section, FIGURE 11 being taken substantially on the line 11—11 of FIGURE 5, looking in the direction of the arrows and illustrating the operation of the material pick-up tines.
FIGURE 12 is a top plan view of the pick-up mechanism illustrated in FIGURES 5 and 11, FIGURE 12 being taken substantially on the horizontal plane of line 12—12 of FIGURE 5, looking in the direction of the arrows.

The upper end of an elongated substantially hollow tubular sleeve 148 extends between the arms 132, 134 and is fixedly secured thereto as by welding 150 (see FIGURE 11). From the foregoing description, it will be understood that the discs 140, 142 cooperate in such a manner as to brake or damp the pivotal movement of the sleeve 148 about the horizontal axis of the bolt 136.

Telescoped within the lower end of the sleeve 148 is a solid cylindrical shaft 152 which is secured against rotation therein by means of the diametrically extending pins 154, 156, the pins being disposed in vertically spaced relation with their respective longitudinal axes being disposed substantially perpendicular to each other. The lower end of the shaft 152 is reduced in diameter to form a substantially cylindrical shoulder 158 and is further necked down to form a second solid cylindrical shaft 160. The functions of the shoulder and the last named shaft will be set forth in detail below.

To the lower end of the sleeve 148 is fixedly secured, as by welding 162, a sprocket 164 whose function will also be made apparent as this specification proceeds.

Reference numeral 166 (see FIGURES 11 and 12) designate a substantially open rectangular frame formed of a pair of angle iron end members 168, 170 and a pair of longitudinally extending side angle iron members 172, 174.

The open rectangular frame 166 is rotatably supported (see FIGURES 13 and 14) on the extending solid cylindrical shaft 160 by means of a support plate 176 which extends transversely of the frame 166 intermediate and centrally of the opposed ends thereof. As is seen in the last mentioned figures, the support plate 176 is centrally apertured at 178 to permit the shaft 160 to project therethrough, the shaft 160 being journalled in bearings 180 disposed in a bearing housing 182 welded at 184 to the support plate 176. The bearing assembly is maintained by means of a lock washer 186 and lock nut 188. It is thus seen that the frame 166 is rotatably supported on the shaft 160.

Secured to the upper end of the side angle iron 174 and to the upper end of the end angle iron 168 is an L-shaped mounting plate 190 having a leg portion 192 extending transversely of the frame 166 and terminating in a downwardly turned foot portion 194 which is disposed in spaced relation relative to the side angle iron 172. The leg portion 192 is formed with a longitudinally extending slot 196 which is substantially parallel to the longitudinal axis of the frame 166. A sprocket 198 is interposed between a pair of thrust bearing blocks 200, 202 of which the bearing block 202 is supported directly on the leg portion 192 of the mounting plate 190. Reference numeral 204 denotes, in general, chain tightener means which includes a bight portion 206 from one end of which longitudinally projects a flange 208 slotted at 210 and which is super-imposed against the bearing block 200. As is clearly seen in FIGURE 13, a bolt 212 extends through the slot 196 and through suitable apertures formed in the sprocket 198 and the bearing blocks 200, 202, as well as through the slot 210. The relative position of the bolt 212 within the slots 196 and 210 is secured by a conventional nut 214. The other end of the bight 206 terminates in a longitudinally extending offset flange 216 having a longitudinally extending slot 218 formed therein to receive therethrough a second belt tightening adjusting bolt 219 held in its adjusted position by means of the nut 220. The bolt 219 extends transversely through the bight portion 222 of an inverted substantially U-shaped support member 224 having depending side walls 226, 228. The depending side walls 226, 228 of the support member 224 are connected at their respective lower ends to the angle iron members 172, 184 as viewed in FIGURES 13, 14 and 15.

Figure 13:
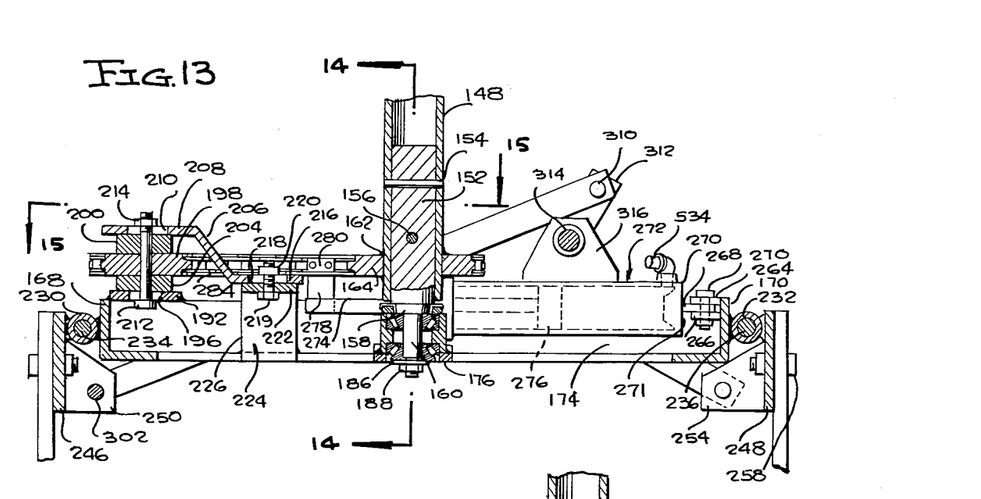
FIGURE 13 is an enlarged detail medial longitudinal cross-sectional view of the bale pick-up device, FIGURE 13 being taken substantially on the vertical plane of line 13—13 of FIGURE 5, looking in the direction of the arrows.
Figures 14, 15:
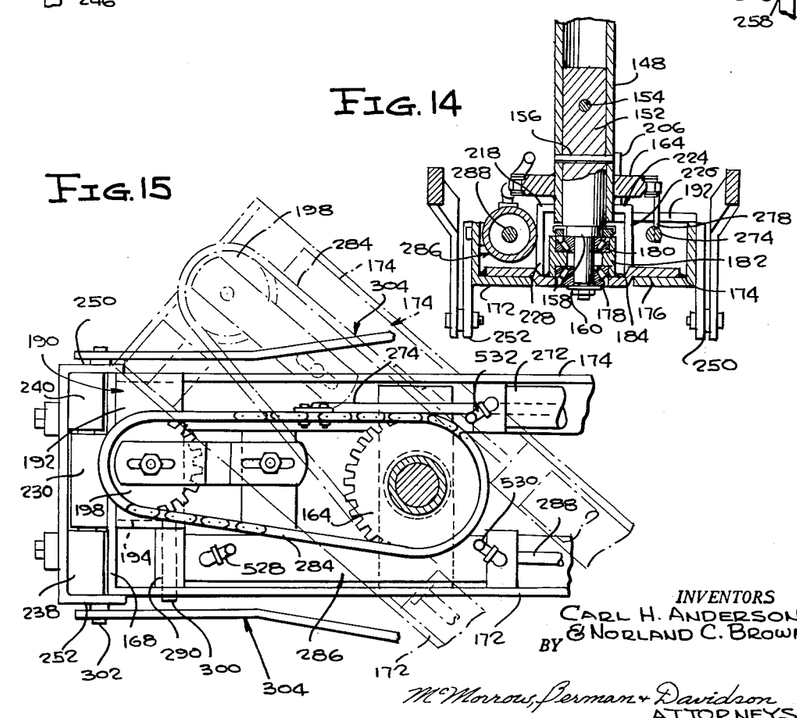
FIGURE 14 is a detail cross-sectional view of the bale pick-up device, FIGURE 14 being taken substantially on the vertical plane of line 14—14 of FIGURE 13, looking in the direction of the arrows.
FIGURE 15 is a partial top plan view of the bale pick-up device illustrating in phantom lines a turning position thereof, FIGURE 15 being taken substantially on the horizontal plane of line 15—15 of FIGURE 13, looking in the direction of the arrows.

As is seen in FIGURES 12 and 13, substantially hollow cylindrical hinge barrels 230, 232 are fixedly secured to the exterior sides of the end angle iron members 168, 170. Through the hinge barrels 230, 232 longitudinally extend a pair of hinge pins 234, 236, respectively. The remote ends of each of the hinge pins 234, 236 receive for rotation thereon a pair of hinge barrels 238, 240 and 242, 244, respectively. The last named pairs of hinge barrels 238, 240 and 242, 244 are fixedly secured, as by welding, to transversely extending bars 246, 248 having at their respective opposed ends inwardly projecting gears 250, 252 and 254, 256. To the bars 246, 248 are bolted at 258 a plurality of arcuately shaped tines 260, 262 which are bowed to converge towards each other. To the end angle iron member 170 is secured a pair of inwardly extending lips 264, 266 disposed in vertically spaced and substantially parallel relation and which receive therebetween a tongue 268 secured thereto by a bolt 270. The tongue 268 is, in turn, connected to the end 271 of a hydraulic jack 272 having a piston rod 274 to which is connected an internally disposed piston 276. To the outer end of the rod 274 is affixed a vertically extending lug 278 (see FIGURE 13) to which is secured one end of a connector member 280 (again see FIGURE 13), the other end of which is fixedly connected to a substantially rectangular link 282 (see FIGURE 15) of a chain 284 that is trained about the sprockets 164, 198. Thus, as the piston rod 274 is reciprocated (under conditions to be described) the chain 284 will wrap around the sprocket 164 and turn the sprocket 198 to cause the frame 166 to turn in a clockwise or counterclockwise direction with respect to the axis of the cylindrical shaft 152 in response to the direction of movement of the piston rod 274.

A second hydraulic jack is designated at 286 and includes the conventional piston (not shown) to which is fixedly secured one end of a piston rod 288. The jack 286 has secured to one end thereof a normally horizontal hinge barrel 290 and is supported on the side angle member 172 and the foot portion 194 of the mounting plate 190 by means of a pin 300. As is seen in the drawings, the forward ends of each of the jacks 272, 286 are fixedly connected to the side angle members 172, 174 by any conventional means.

A shaft 302 extends between and is supported by the gears 250, 252 and extends beyond the remotely disposed sides thereof. On the remotely positioned ends of the shaft 302 are pivotally connected one of the ends of a pair of identically constructed levers 304. The other of the ends of the levers 304 terminate in bifurcated arms 306, 308 which embrace therebetween and are pivotally connected at 310 (see FIGURES 12 and 13) to one end of an elongated substantially rectangular lever 312 which is pivotally supported intermediate its respective ends on a cross shaft 314. The cross shaft 314 is, in turn, rotatably journalled in a pair of gusset plates 316 which project vertically from the angle iron side members 172, 174.

To the gears 254, 256 is pivotally connected at 318 one of the ends of a pair of levers 320, the other ends of the levers 320 being bifurcated (see FIGURE 12) to receive therebetween the other or lower end of the lever 312. As is seen in the several drawings, the bifurcated end of the levers 320 is pivotally connected at 322 to the lever 312. The cross shaft 314 is fixedly secured to the lever 312 for rotation therewith and has connected thereto for rotation therewith a depending link 324 having its lower end provided with an elongated longitudinally extending slot 326. As is seen in FIGURE 11, the slot 326 is engaged by a lug 328 which projects laterally from the outer end of the piston rod 288. Thus, as the piston rod 288 reciprocates under given conditions, the tines 260, 262 will move from their full line closed positions illustrated in FIGURE 11 to the dotted line positions thereof to reach their open positions.

Referring now more specifically to FIGURES 5, 7, 8 and 9 it will be seen that to one of the cross braces 28 is secured a substantially U-shaped yoke 230 which receives therein a tongue 332 fixedly secured to one end of the hydraulic jack or motor 334. The other end of the hydraulic jack or motor 334 is fixedly secured by a U-shaped bracket 336 to a cross strut 338, the opposed end of the latter being fixedly secured to the side chassis frame members 24, 26. Projecting from the last mentioned end of the hydraulic jack or motor 334 is a piston rod 340. As is clearly seen in FIGURES 5, 7 and 9, the outer end of the piston rod 340 is rigidly secured to a substantially rectangular connector member 342 connected by bolts 344 to a substantially rectangular link such as the line 282 by means of bolts 344. Thus, the piston rod 340 is placed in driving relation relative to a chain 346 which is trained about the sprocket 84 and a sprocket 348 mounted on an axle 350 which is, in turn, mounted on a suitably supported chain take-up means designated, in general, by reference numeral 352. Consequently, as the piston rod 340 reciprocates, the sprocket 84 will rotate and effects rotation of the shaft 82 with attendant rotation of the tubular sleeve 86. As the tubular sleeve 86 rotates about its vertical axis, the booms 106 and 130 will rotate in the same direction and to the same degree.

Between the substantially parallel flanges 92A and 92B and adjacent the lower ends thereof is supported the opposed ends of a rod 354 which is encompassed by a housing 356 rigidly secured to one end of a hydraulic jack or motor 358. From the other end of the hydraulic jack or motor 358 projects a piston rod 360 which carries a cross head 362 which is connected thereto by means of a pin 364 and a clevis member 366. To the hollow tubular sleeve 86 is secured a plate carrying chain tightening means designated, in general, at 370 which includes a transversely extending hollow tubular member 372 in the opposed open ends of which are rotatably mounted a pair of stub axles 374, 376 on which are mounted a pair of sprockets 378, 380, respectively. A chain 382 is trained around the sprockets 100 and 378 and another chain 384 is trained around sprockets 102, 380. As is seen clearly in FIGURES 4 and 5 the chains are not continuous being interrupted by connector members 386 for connection to the cross head 362. Thus, as the chains 382, 384 are moved under the influence of the reciprocating piston rod the booms 106, 130 are rotated about the horizontal axis of the axle 94.

To the boom 106 is secured a pair of laterally spaced standard plates 388, 390 which receive and support therebetween a pin 392 which is encompassed by a housing 394 fixedly secured to one end of a hydraulic jack or motor 396. The other end of the hydraulic jack or motor 396 is fixedly secured to the apex of an inverted substantially V-shaped bridge 400, the outer ends of the arms thereof being fixedly secured to the boom 106. Fixedly secured to the boom 106 forwardly of the other end of the hydraulic jack or motor 396 is chain tightener means which includes a hollow tubular member 404 which is fixedly secured thereto, the hollow tubular member supporting therein a longitudinally extending axle 406, the opposed ends of the latter having secured thereto sprockets 408, 410.

From the aforementioned other end of the hydraulic jack 396 projects a reciprocable piston rod 412 which terminates in a clevis 414 to which is secured by means of a pin 416 a connector plate 418 to which are connected at opposed ends thereof, respectively, by means 420 of a pair of chains 422, 424, the chain 422 being trained around the sprockets 214, 408 and the chain 424 being trained around the sprockets 126 and 410. It is thus seen that the boom 130 is rotatable around the horizontal axis of the axle 108 relative to the boom 106.

Figure 4:
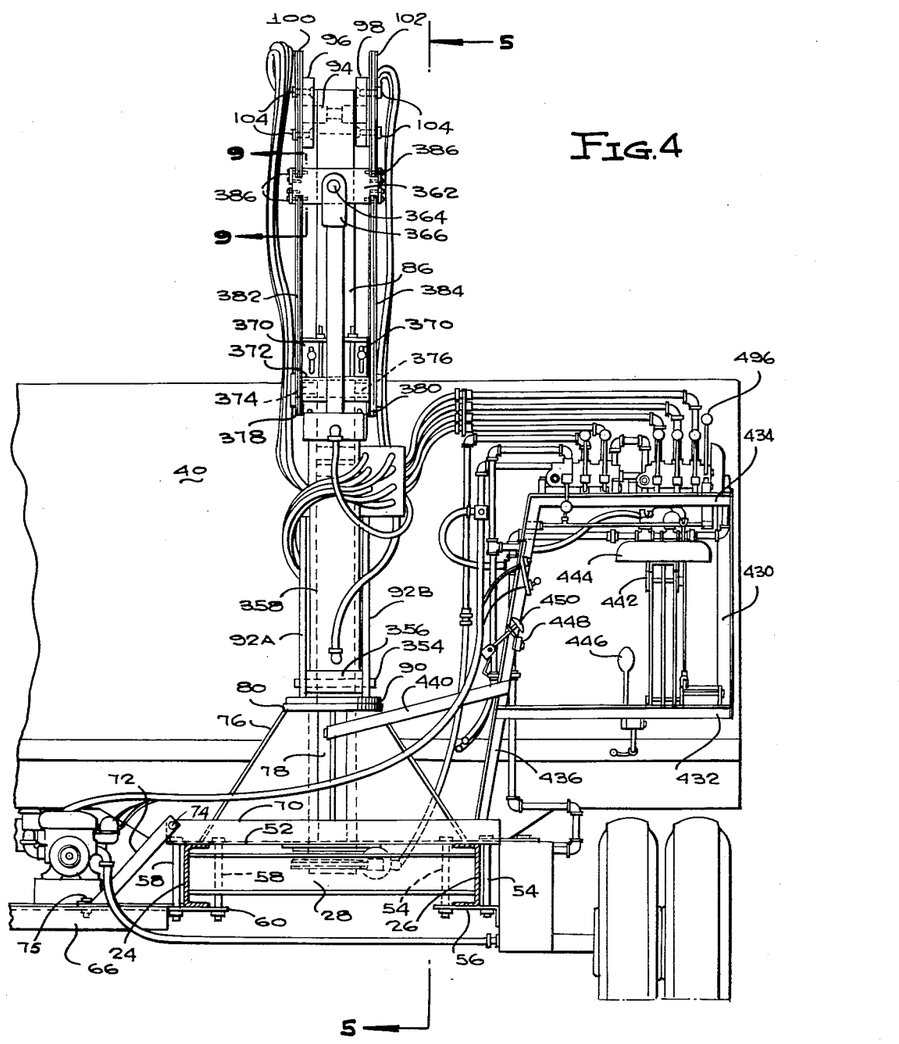
FIGURE 4 is an end elevational view of the hydraulically controlled material handling device and includes the controls therefor as well as for the operation of the truck or vehicle upon which the apparatus is mounted.
Figures 5, 10:
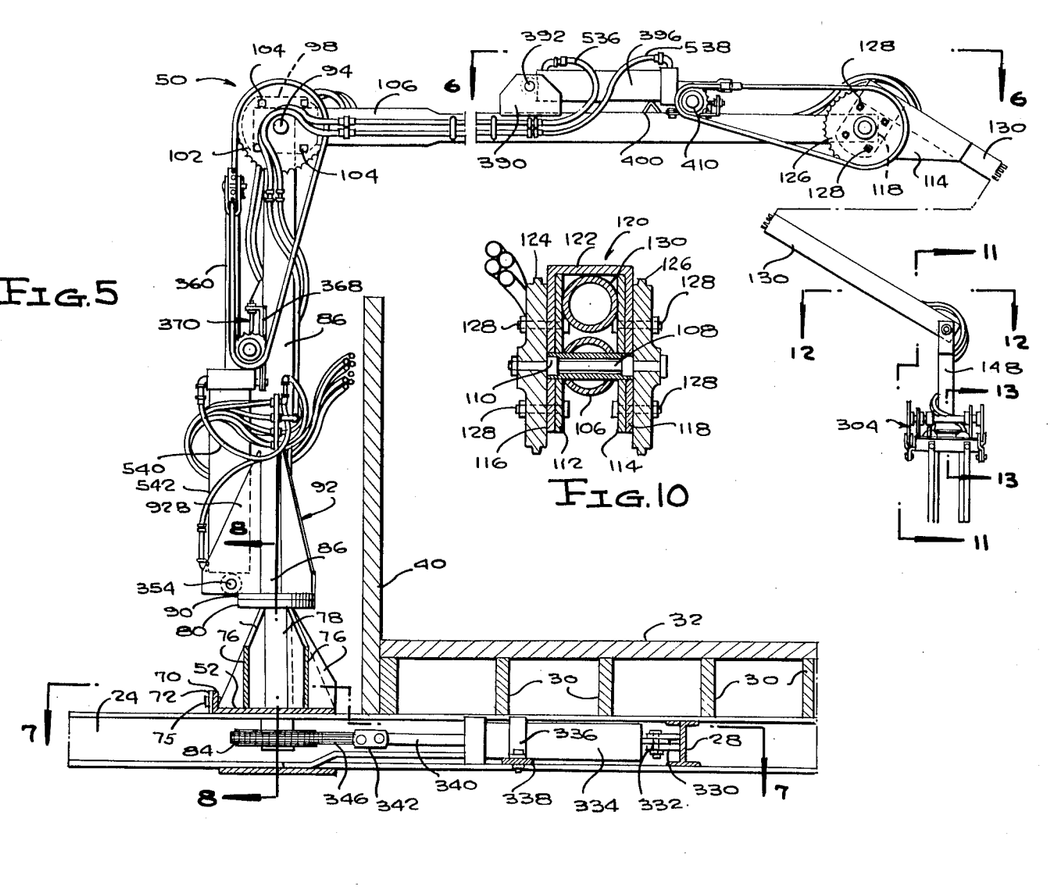
FIGURE 5 is a side elevational view of the hydraulically operated lifting apparatus, FIGURE 5 being partly in cross-section and being taken substantially on the vertical plane of line 5—5 of FIGURE 4, looking in the direction of the arrows.
FIGURE 10 is an enlarged detail cross-sectional view taken substantially on the vertical plane of line 10—10 of FIGURE 1, looking in the direction of the arrows, and illustrating the pivotal connection between the two booms.
Figure 6:
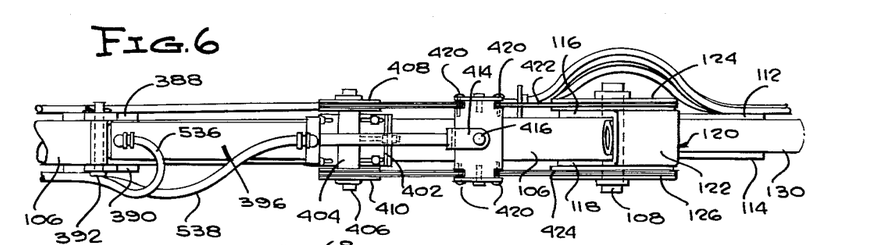
FIGURE 6 is a fragmentary top plan view of a pair of pivotally connected booms, FIGURE 6 being taken substantially on the horizontal plane of line 6—6 of FIGURE 5, looking in the direction of the arrows.
Figure 7:
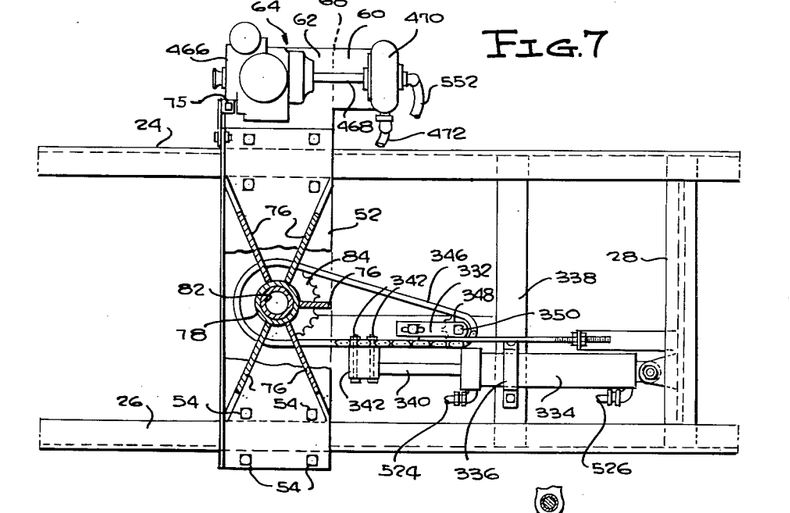
FIGURE 7 is a plan view, partly in cross-section, FIGURE 7 being taken substantially on the horizontal plane of line 7—7 of FIGURE 5, looking in the direction of the arrows.

Reference is now made more specifically to FIGURES 1 to 5, inclusive, which illustrate the control means by which the vehicle and the several component parts of the vehicle loading device are operated. Reference numeral 426 denotes a substantially rectangular platform which projects laterally and rearwardly from the inner end wall 40 and is rigidly secured in place by means of the angle iron members 428, 430, 432, 434 and 436. As is seen in FIGURE 4, one end of the angle iron member 436 is fixedly secured to the chassis side frame member 26. The frame is further reinforced by brace members 438, 440 which extend to and are secured to flanges 76. Extending from the end wall 40 and vertically spaced above the platform 426 is an inverted substantially U-shaped channel member 442 to the outer end of which is fixedly secured an operator's seat 444. Pivotally mounted on the platform 426 is a foot operated lever 446 which is connected through conventional linkage means 448 with the clutch pedal 48 located in the operator's cab 34 and the connection between the pedals 48 and 446 is such that when either is in or out the other of the pedals is similarly actuated. Projecting laterally from the angle iron member 436 (see FIGURE 4) is an extension bar 448 which has operatively mounted thereon a hand actuated lever 450 which is connected with a cable 452 that is trained around a pulley 454 and with one end of a cross bar 456 centrally of the ends thereof. To the remotely disposed ends of the cross bar 456 is connected kinematic means 458, 460 which are, in turn, connected to the rear wheel brakes 462, 464 of the vehicle 10.

Reference numeral 466 designates a conventional motor having a drive shaft 468 connected in driving relation with a drive shaft of a pump 470 which is connected in a hydraulic system. The system includes a high pressure line 472 which is connected through a bypass valve 473 to a plurality of manually operated valves 474, 476, 478, 480, 482 and 484 mounted en banc on the inner end wall 40. The last mentioned valves are of conventional design and are provided with interconnecting passages or conduits such as, for example, 472A whereby the fluid under high pressure in the line 472 is made constantly available to each valve. The valves 474, 476, 478, 480, 482 and 484 are provided with manually operable control handle means 486, 488, 490, 492, 494 and 496. Each of the valve handle operating means are adapted to be moved, selectively, to one of three positions, namely, to a forward, reverse, and neutral position.

Each of the last mentioned valves are connected through suitable conduits for controlling the steering of the vehicle as well as accomplishing the turning and lifting movement of the component elements of this device in the manner described above. For example, the high pressure side of the valve 74 is connected through a conduit 498 to one end of a hydraulic jack 500 which is fixedly secured to the front axle 502 of the vehicle 10. The other end of the hydraulic jack 500 also connects with the high pressure side or line 472 through the conduit 504. Reference numeral 506 denotes a reciprocating piston rod having one of its ends fixedly connected to the piston 508. The other end of the piston rod 506 is rigidly secured to the steering tie rod 510 whereby as hydraulic pressures are alternately imposed on opposite sides of the piston 508, the tie rod 510 will be shifted in its position to effect a turning movement of the front wheels 512. The arrangement is such in the valve 474 that as pressure is applied to one side of the piston 508 it is reduced on the other side to be returned through suitable passages formed in the several valves to the low pressure conduit 514 through a one-way check valve 516 interposed between it and a return conduit 518. The fluid return conduit 518 connects with the fluid reservoir 520 which, in turn, through conduit 522 returns to the inlet side of the pump 470. Of course, when the valve handle 46 is moved to its neutral position the pressures on the opposite sides of the piston 508 will equalize thereby holding the piston rod 506 in a selected adjusted position.

In a similar manner conduits 524 and 526 are alternately connected with opposite sides of the piston 335 and with the low pressure line 514 as the handle 488 is operated. Subjecting either side of the piston 335 to high pressure hydraulic fluid causes the piston 335 to move in the direction of the high power and consequently cause the piston 340 to move in that direction, and this, in turn, causes the chain 346 to rotate about the sprockets 84, and 348. This, of course, effects rotation of the hollow tubular shaft 86 about its vertical axis.

In a similar manner actuation of the handle member 490 from its neutral position will cause fluid under pressure to flow through the valve 478 in either of the two conduits 528, 530 for application against opposite sides of the piston 287 of the hydraulic jack 286. When this action takes place the piston rod 288 is actuated causing the lever 324 to pivot with the shaft 314 in the manner described above to effect operation of the levers 304 and 320. Depending upon the direction of the rotation of the shaft 314, the tines 260, 262 will be moved towards and away from each other for alternate engagement and disengagement from a bale, package or other similar article.

Actuation of the valve lever 492 of a valve 480 introduces fluid under pressure on opposite sides of the piston 276 disposed in the hydraulic jack 272 to force movement of the piston rod 274 in a selected direction. Since the piston rod 274 is directly connected with the chain 284 which is, in turn, trained around the sprockets 164 and 198, the frame 166 is caused to rotate about the vertical axis of the shaft 148.

Operation of the valve actuating handle 494 of the valve 482 causes fluid under pressure to enter selectively, the conduits 536, 538 for introduction into the hydraulic jack 396 on opposite sides of the piston 397 to effect movement of the piston rod 398 which is, as has been described before, fixedly secured to the chain 424 trained about the sprockets 126, 410. As the piston rod reciprocates in one direction or the other, the boom 130 is made to pivot about the horizontal axis of the shaft 108.

Operation of the valve handle 496 of the valve 484 causes fluid under pressure to pass through either of the two conduits 540, 542 and into the hydraulic jack 358 to exert pressure on opposite sides of the piston rod 359 to which is connected the inner end of the piston rod 360. As has been detailed above, the outer end of the piston rod 360 is integrally connected to the chains 382, 384 through the sprockets 100, 102 and 378, 380 whereby the boom 106 is elevated or depressed.

From the foregoing description it should now be apparent that the articulation of the pick-up device is such as to permit the same to be rotated about a single vertical axis and three horizontal axes of which two are power driven while the third (the bolt 136) permits the tubular sleeve 148 to rotate thereon in such a manner as to maintain the frame 166, under the force of gravity, substantially horizontal.

Having described and illustrated one embodiment of this invention it is to be understood that the same is offered merely by way of example and that the invention is to be limited only by the scope of the appended claims.

What is claimed is:

1. A vehicle loading device including a chassis and a bed to be loaded comprising a normally vertical member mounted for rotation about its vertical axis on said chassis, a boom having one of its ends mounted on said vertical member for rotation about a horizontal axis, a frame freely mounted on the other end of said boom for pivotal movement about a horizontal axis under the force of gravity, a plurality of article loading tines pivotally mounted on said frame for movement towards and away from each other to grasp and release an article to be loaded on said bed, means for effecting rotation of said member about said vertical axis, means for rotating said boom about said horizontal axis independently of said first means, said means for rotating said boom about said horizontal axis being movable in a direction parallel to said vertical axis of said vertical member and disposed in a plane perpendicular to said horizontal axis, means on said frame for effecting alternate movement of said tines towards and away from each other independently of said last named two means, and means for damping said pivotal movement of said frame about its said horizontal axis.

2. A vehicle loading device including a vehicle chassis and a bed thereon to be loaded, said device including a normally vertical member supported for rotation about its vertical axis on said chassis, a first boom having one of its ends connected to said member for pivotal movement thereon about a horizontal axis, a second boom having one of its ends pivotally connected to the other end of said first boom for pivotal movement relative thereto about a horizontal axis, a substantially hollow tubular sleeve having one of its ends pivotally connected to the other end of said second boom for movement about a horizontal axis, a frame freely mounted for pivotal movement on the other end of said sleeve and about the longitudinal axis thereof, article pick-up tines mounted for pivotal movement towards and away from each other on said frame, means for effecting pivotal movement of said vertical member, means for pivoting said first boom relative to said vertical member about a horizontal axis, said pivotal means being operable in a direction parallel to said vertical axis of said vertical member disposed in a plane perpendicular to said horizontal axis, means for pivoting said second boom relative to said first boom about a horizontal axis, and means for effecting said pivotal movement of said tines towards and away from each other.

3. A vehicle loading device as defined in claim 2, wherein all of said means are selectively operable independent of each other.

4. A vehicle loading device as defined in claim 2, wherein all of said means include hydraulic means for effecting their respective operations selectively and independently of each other, and control means therefor.

5. A vehicle loading and unloading device comprising a wheel supported chassis including a bed to be loaded and unloaded, a normally vertical shaft supported on said chassis for rotation about its vertical axis, a first sprocket fixedly secured to said shaft at the lower end thereof, a second sprocket mounted for rotation on said chassis, said first and second sprockets being mounted on horizontal axes and disposed perpendicular thereto, a chain trained around said first and second sprocket, a hydraulic jack fixedly secured to said chassis and having a reciprocable piston rod extending from one end thereof, said piston rod being movable in a direction parallel to said vertical axis of said shaft, means fixedly securing said piston rod to said chain to effect clockwise and counterclockwise movement thereof in accordance with the reciprocable movement of said piston rod whereby said shaft is pivoted about its said vertical axis, valve means for controlling the direction of reciprocation of said piston rod and consequently the direction of the pivotal movement of said shaft, a boom projecting laterally from said shaft and having one end secured thereto, a sleeve having one of its ends pivotally connected to the other end of said boom and depending therefrom for movement about a horizontal axis, a frame mounted on the other end of said sleeve, a plurality of oppositely disposed tines pivotally mounted on said frame for movement towards and away from each other, and means supported on said frame and connected with said tines to effect said pivotal movement thereof.

6. A vehicle loading and unloading device comprising a wheel supported chassis including a bed to be loaded and unloaded, said bed extending longitudinally of said chassis and having an inner end, a shaft disposed adjacent said inner end of said bed and having a normally extending vertical axis, said shaft being mounted for rotation on said chassis, a first sprocket fixedly secured to the lower end of said shaft, a second sprocket mounted for rotation on said chassis, said first and second sprockets being disposed in a plane perpendicular to said vertical axis, a chain trained about said first and second sprockets, a hydraulic jack having a reciprocable piston rod extending from one end thereof, means fixedly securing said piston rod to said chain to effect clockwise and counterclockwise movement thereof in response to the movement of said piston rod whereby said shaft is rotated about its said vertical axis, valve means for controlling said hydraulic jack, a first sleeve telescoped over said shaft and secured thereto, a boom, said boom having one of its ends connected to said first sleeve for pivotal movement about a horizontal axis and being pivotal transversely across said bed, hydraulic means fixedly secured against movement to said first sleeve, said hydraulic means including a piston rod connected with said boom and operable in a direction parallel to said vertical axis of said shaft to effect said pivotal movement thereof about said horizontal axis, a sleeve having one of its ends freely pivotal on the other end of said boom about a horizontal axis in response to the force of gravity, a normally horizontal elongated substantially rectangular frame mounted on said sleeve for pivotal movement about the longitudinal axis thereof, said frame having a pair of opposed ends, a plurality of tines pivotally mounted on said ends of said frame for movement towards and away from each other, means on said frame for effecting said pivotal movement of said frame relative to said sleeve, and means on said frame for effecting said pivotal movement of said tines.

7. A vehicle loading and unloading device comprising a wheel supported chassis including a bed to be loaded and unloaded, said bed extending longitudinally of said axis and having an inner end, a shaft disposed adjacent said inner end of said bed and having a normally extending vertical axis, said shaft being mounted for rotation on said chassis, a first sprocket fixedly secured to the lower end of said shaft, a second sprocket mounted for rotation on said chassis, said first and second sprockets being disposed in a plane perpendicular to said vertical axis, a chain trained around said first and second sprockets, a hydraulic jack having a reciprocable piston rod extending from one end thereof, means fixedly securing said piston rod to said chain to effect clockwise and counterclockwise movement thereof in response to the movement of said piston rod whereby said shaft is rotated about its said vertical axis, valve means for controlling said hydraulic jack, a boom having one of its ends connected to said shaft and pivotal therewith transversely across said bed, means pivotally connecting said one end of said boom to said shaft, about a horizontal axis, hydraulic means fixedly secured against movement to said shaft, said hydraulic means including a piston rod connected with said boom and operable in a direction parallel to said vertical axis, a second boom extending longitudinally of said first boom, means pivotally connecting the other end of said first boom with one end of said second boom for pivotal movement about a horizontal axis, means for effecting said pivotal movement of said second boom relative to said first boom, a sleeve having one of its ends freely pivotal on the other end of said second boom about a horizontal axis in response to the force of gravity, a normally horizontally elongated substantially rectangular frame mounted on said sleeve for pivotal movement about the longitudinal axis thereof, hydraulic means mounted on said frame for effecting said pivotal movement thereof about said longitudinal axis of said sleeve, said frame having a pair of opposed ends, a plurality of tines pivotally mounted on said ends of said frame for movement towards and away from each other, hydraulic means carried by said frame for effecting said pivotal movement of said tines, and control means for said last named two hydraulic means.

8. A loading and unloading device for a wheeled vehicle including motor means for driving said vehicle and braking means for the wheels thereof, said loading and unloading means comprising a wheel supported chassis including a bed to be loaded and unloaded, said bed extending longitudinally of said chassis and having an inner end, a shaft having a normally extending vertical axis mounted for rotation on said chassis, a first sprocket fixedly secured to the lower end of said shaft, a second sprocket mounted for rotating on said chassis in spaced relation relative to said first sprocket, said first and second sprockets being disposed in a plane perpendicular to said vertical axis, a chain trained about said first and second sprockets, a hydraulic jack having a reciprocable piston rod extending from one end thereof, means fixedly securing said piston rod to said chain to effect clockwise and counterclockwise movement thereof in response to the movement of said piston rod whereby said shaft is rotated about its said vertical axis, valve means for controlling said hydraulic jack, a sleeve telescoped over said shaft, means supporting the lower end of said sleeve in elevated position above said bed, means connecting said sleeve with said shaft for rotation therewith, a first boom having one of its ends pivotally connected to the upper end of said sleeve for movement about a horizontal axis, said pivotal connection comprising a horizontal axle, said first boom being also pivotal transversely across said bed, a second boom having one of its ends pivotally connected to the other end of said first boom about a horizontal axis, means supported on said first boom and connected with said second boom to effect said last named pivotal action of said second boom relative to said first boom, a sleeve having one of its ends pivotally connected to the other end of said second boom, said sleeve normally having its longitudinally extending axis perpendicular to a horizontal plane, an elongated substantially rectangular frame having a pair of opposed ends, means securing said frame to the other end of said sleeve for rotation about its longitudinally extending axis, hydraulic means carried by said frame to effect pivotal movement of said frame about said last named axis, means for controlling said last named hydraulic means, a plurality of tines mounted on said opposed ends of said frame for pivotal movement towards and away from each other, hydraulic means supported on said frame for effecting operation of said tines, control means for said last named hydraulic means, hydraulic means for controlling the steering of said vehicle, control means supported on said bed for controlling said hydraulic steering means, and means supported from said bed for setting and releasing the brakes of said vehicle.

9. A vehicle loading and unloading device, said vehicle including a wheel supported chassis having a bed thereon to be loaded and unloaded, said device comprising a vertically-elongated shaft, means on said bed supporting said shaft in its upright position, a first sprocket fixedly secured on the lower end of said shaft, a second sprocket mounted for rotation on said chassis, a first endless chain trained around said first and second sprockets, a first hydraulic jack having a reciprocable first piston rod extending from one end thereof, means fixedly connecting said first hydraulic jack on said chassis, means fixedly connecting said first piston rod with said first chain whereby reciprocation of said first piston rod effects movement of said first chain in a clockwise or counterclockwise direction and thereby drives said shaft in a corresponding direction, a first sleeve telescoped over said shaft and having its lower end bearing against said supporting means, a first boom, a first horizontally-extending axle connecting one end of said first boom with the upper end of said first sleeve and projecting beyond the remotely-disposed sides thereof, said first axle being supported on said upper end of said first sleeve for rotation about its longitudinal axis, a third and fourth sprocket fixedly secured, respectively, on the opposed ends of said first axle, fifth and sixth sprockets mounted for rotation on opposite sides of said first sleeve intermediate its ends, a second endless chain trained around said third and fifth sprockets and a third endless chain trained around said fourth and fifth sprockets and a third endless chain trained around said fourth and fifth sprockets, a second hydraulic jack fixedly connected to said first sleeve and preventing relative movement therebetween, said second hydraulic jack having a second piston rod extending from one end thereof, means fixedly connecting said second piston rod with said second and third chains whereby reciprocation of said second piston rod effects movement, substantially simultaneously, of said second and third chains in a clockwise or a counterclockwise direction and thereby drive said third, fourth, fifth and sixth sprockets and said axle in a corresponding direction and thereby causing said first boom to pivot upwardly or downwardly, a second boom, a second axle extending horizontally across the other end of said first boom, means fixedly connecting one end of said second boom with said second axle, seventh and eighth sprockets fixedly secured, respectively, to the opposed ends of said second axle, ninth and tenth sprockets mounted for rotation on said second boom, a fourth endless chain trained around said seventh and ninth sprockets, a fifth endless chain trained around said eight and tenth sprockets, a third hydraulic jack having a third reciprocating piston rod extending from one end thereof, means fixedly connecting said third piston rod with said fourth and fifth chains whereby reciprocation of said piston rod drives said seventh, eighth, ninth and tenth sprockets in a clockwise or a counterclockwise direction and causing said second boom to pivot upwardly or downwardly about said second axle, an elongated second sleeve, means pivotally connecting one end of said second sleeve with the other end of said second boom, a second shaft having an end thereof telescopically received in and fixedly secured to the other end of said second sleeve, an elongated substantially open rectangular frame, means disposed centrally of said frame connecting said frame for rotation on the other end of said second shaft, an eleventh sprocket fixedly secured on said second shaft, a twelfth sprocket mounted for rotation on said frame, a fifth endless chain trained around said eleventh and twelfth sprockets, a fourth hydraulic jack having a fourth reciprocable piston rod extending from an end thereof, means securing said fourth hydraulic jack on said frame, means fixedly connecting said fourth piston rod with said fifth endless chain whereby reciprocation of said fourth piston rod causes said fifth endless chain to drive said twelfth sprocket in a clockwise or a counterclockwise direction while said eleventh sprocket remains stationary thereby turning said frame in a corresponding direction, a plurality of material pick-up tines pivotally supported on a pair of opposed ends of said frame, said tines being pivoted for substantially simultaneous movement toward and away from each other, linkage means connecting said tines to effect said simultaneous movement, a fifth hydraulic jack mounted on said frame and having a reciprocable fifth piston rod extending from an end thereof, means connecting said fifth piston rod with said linkage means to effect operation thereof, and independently-operable control means for each of said hydraulic jacks.

References Cited in the file of this patent

UNITED STATES PATENTS

| | | |
|---|---|---|
| 2,801,759 | Adams | Aug. 6, 1957 |
| 2,812,070 | Delzer | Nov. 5, 1957 |
| 2,921,701 | Ireland | Jan. 19, 1960 |